(12) United States Patent
Parker et al.

(10) Patent No.: US 6,884,034 B1
(45) Date of Patent: Apr. 26, 2005

(54) ENHANCEMENTS TO HIGH EFFICIENCY CEILING FAN

(75) Inventors: Danny S. Parker, Cocoa Beach, FL (US); Guan Hua Su, Rowland Heights, CA (US); Bart D. Hibbs, Monrovia, CA (US)

(73) Assignee: University of Central Florida, Orlando, FL (US)

( * ) Notice: Subject to any disclaimer, the term of this patent is extended or adjusted under 35 U.S.C. 154(b) by 62 days.

(21) Appl. No.: 10/121,388

(22) Filed: Apr. 12, 2002

Related U.S. Application Data

(63) Continuation-in-part of application No. 09/976,515, filed on Oct. 12, 2001, and a continuation-in-part of application No. 09/711,599, filed on Nov. 13, 2000, now Pat. No. 6,415,984, which is a division of application No. 09/415,883, filed on Oct. 8, 1999, now Pat. No. 6,189,799, which is a division of application No. 09/067,236, filed on Apr. 27, 1998, now Pat. No. 5,996,898, which is a continuation-in-part of application No. 09/056,428, filed on Apr. 7, 1998, now Pat. No. 6,039,541.

(60) Provisional application No. 60/342,564, filed on Dec. 26, 2001, and provisional application No. 60/265,241, filed on Jan. 31, 2001.

(51) Int. Cl.[7] ............................................. F04D 29/38
(52) U.S. Cl. .................. 416/1; 416/223 R; 416/243; 416/DIG. 5
(58) Field of Search ..................... 416/1, 5, 170 R, 416/210 R, 223 R, 243, DIG. 5

(56) References Cited

U.S. PATENT DOCUMENTS

| | | | |
|---|---|---|---|
| 1,506,937 A | 9/1924 | Miller | |
| 1,903,823 A | 4/1933 | Lougheed | |
| 1,942,688 A | 1/1934 | Davis | |
| 2,088,312 A * | 7/1937 | Weber | 454/230 |
| 2,231,746 A * | 2/1941 | Ballentine | 415/8 |
| 2,283,956 A | 4/1942 | Smith | 170/159 |
| 2,345,047 A | 3/1944 | Houghton | 170/162 |
| 2,450,440 A | 10/1948 | Mills | 170/159 |
| 2,682,925 A | 7/1954 | Wosika | 170/159 |
| 4,197,057 A | 4/1980 | Hayashi | 416/242 |
| 4,325,675 A | 4/1982 | Gallot et al. | 416/223 |
| 4,411,598 A | 10/1983 | Okada | 416/223 |
| 4,416,434 A | 11/1983 | Thibert et al. | 244/35 |
| 4,693,673 A * | 9/1987 | Nee | 416/199 |
| 4,730,985 A | 3/1988 | Rothman et al. | 416/228 |
| 4,782,213 A | 11/1988 | Teal | 219/372 |
| 4,844,698 A | 7/1989 | Gornstein et al. | 416/223 |
| 4,892,460 A * | 1/1990 | Volk | 416/62 |
| 4,974,633 A | 12/1990 | Hickey | 137/561 |
| 5,033,113 A | 7/1991 | Wang | 455/603 |
| 5,114,313 A | 5/1992 | Vorus | 416/93 |
| RE34,109 E | 10/1992 | Gornstein et al. | 416/223 |
| 5,244,349 A | 9/1993 | Wang | 416/231 |
| 5,253,979 A | 10/1993 | Fradenburgh et al. | 416/223 |

(Continued)

FOREIGN PATENT DOCUMENTS

| | | |
|---|---|---|
| AU | 19987 | of 1929 |
| FR | 1050902 | 1/1954 |
| GB | 676406 | 7/1952 |
| GB | 925931 | 5/1963 |

*Primary Examiner*—Ninh H. Nguyen
(74) *Attorney, Agent, or Firm*—Brian S. Steinberger; Law Offices of Brian S. Steinberger P.A.

(57) ABSTRACT

Twisted ceiling fan blades for low, medium and high speed operation of less than approximately 250 rpm. The novel blades twisted blades can be configured for 60" and 64" diameter fans, and have less blades (3 for example) than conventional flat type bladed fans having 4, 5 blades and have greater air flow and less power draw results than the conventional flat 54 inch fans. Any of the novel twisted blades of 54", 60" and 64" can be run at reduced speeds, drawing less Watts than conventional fans and still perform better with more air flow and less problems than conventional flat type conventional blades.

36 Claims, 11 Drawing Sheets

U.S. PATENT DOCUMENTS

| | | | |
|---|---|---|---|
| 5,328,329 A | 7/1994 | Monroe | 416/62 |
| D355,027 S | 1/1995 | Young | D23/377 |
| 5,516,264 A * | 5/1996 | Anetrini | 416/62 |
| D382,636 S | 8/1997 | Yang | D23/377 |
| 5,860,788 A * | 1/1999 | Sorensen | 416/189 |
| 5,951,162 A | 9/1999 | Weetman et al. | 366/328.1 |
| 6,039,533 A | 3/2000 | McCabe | 415/146 |
| 6,039,541 A | 3/2000 | Parker et al. | 416/223 |
| 6,244,821 B1 | 6/2001 | Boyd et al. | 416/210 |
| 6,254,476 B1 | 7/2001 | Choi | 454/329 |

* cited by examiner

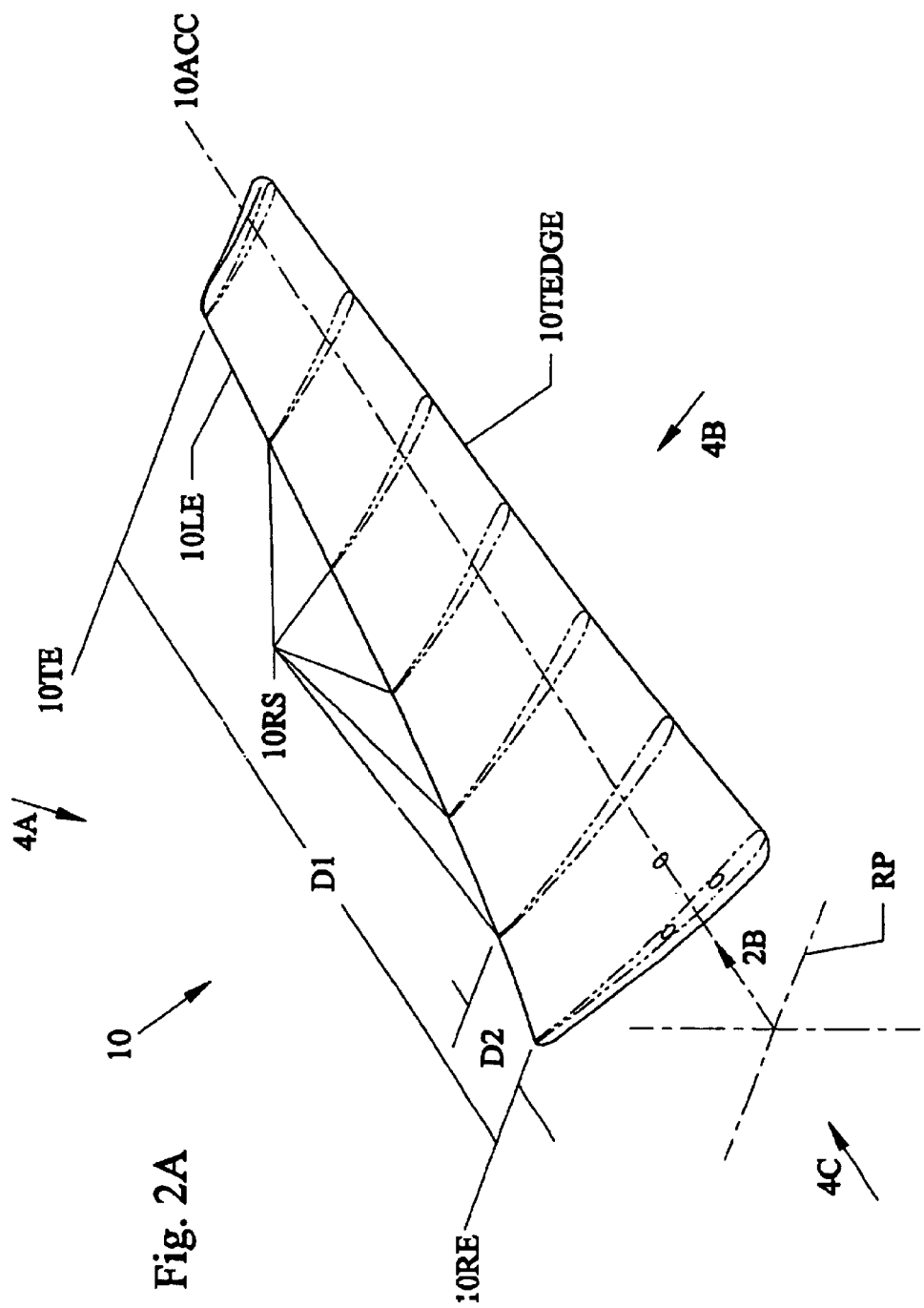

| x/c | y/c |
|---|---|
| 1 | 0 |
| 0.99901 | 0.00387 |
| 0.99606 | 0.00585 |
| 0.99114 | 0.00799 |
| 0.98429 | 0.0101 |
| 0.97553 | 0.01221 |
| 0.96489 | 0.01435 |
| 0.95241 | 0.01672 |
| 0.93815 | 0.01918 |
| 0.92216 | 0.02182 |
| 0.90451 | 0.02457 |
| 0.88526 | 0.0274 |
| 0.86448 | 0.03028 |
| 0.84227 | 0.03325 |
| 0.81871 | 0.03626 |
| 0.79389 | 0.03935 |
| 0.76791 | 0.04246 |
| 0.74088 | 0.04555 |
| 0.71289 | 0.04858 |
| 0.68406 | 0.05148 |
| 0.65451 | 0.05421 |
| 0.62435 | 0.05681 |
| 0.59369 | 0.05914 |
| 0.56267 | 0.06124 |
| 0.5314 | 0.06308 |
| 0.5 | 0.06458 |
| 0.46861 | 0.06581 |
| 0.43733 | 0.06676 |
| 0.40631 | 0.06741 |
| 0.37566 | 0.06779 |
| 0.34549 | 0.06796 |
| 0.31594 | 0.06784 |
| 0.28711 | 0.06748 |
| 0.25912 | 0.06688 |
| 0.23209 | 0.06601 |

FIG. 5A

| | |
|---|---|
| 0.20611 | 0.06491 |
| 0.18129 | 0.06358 |
| 0.15773 | 0.06197 |
| 0.13552 | 0.06011 |
| 0.11474 | 0.05793 |
| 0.09549 | 0.05526 |
| 0.07784 | 0.05213 |
| 0.06185 | 0.04846 |
| 0.04759 | 0.04432 |
| 0.03511 | 0.03956 |
| 0.02447 | 0.03444 |
| 0.01571 | 0.02875 |
| 0.00886 | 0.02292 |
| 0.00394 | 0.01554 |
| 0.00099 | 0.00765 |
| 0 | 0 |
| 0.00099 | -0.0068 |
| 0.00394 | -0.0122 |
| 0.00886 | -0.0158 |
| 0.01571 | -0.0186 |
| 0.02447 | -0.02 |
| 0.03511 | -0.0205 |
| 0.04759 | -0.0204 |
| 0.06185 | -0.0195 |
| 0.07784 | -0.0181 |
| 0.09549 | -0.0162 |
| 0.11474 | -0.014 |
| 0.13552 | -0.0116 |
| 0.15773 | -0.0089 |
| 0.18129 | -0.0061 |
| 0.20611 | -0.0033 |
| 0.23209 | -0.0005 |
| 0.25912 | 0.0022 |
| 0.28711 | 0.00485 |
| 0.31594 | 0.00729 |
| 0.34549 | 0.00949 |

| | |
|---:|---:|
| 0.37566 | 0.01153 |
| 0.40631 | 0.01344 |
| 0.43733 | 0.01521 |
| 0.46861 | 0.01686 |
| 0.5 | 0.01838 |
| 0.5314 | 0.01972 |
| 0.56267 | 0.02086 |
| 0.59369 | 0.0218 |
| 0.62435 | 0.02252 |
| 0.65451 | 0.0229 |
| 0.68406 | 0.02294 |
| 0.71289 | 0.02273 |
| 0.74088 | 0.02216 |
| 0.76791 | 0.02131 |
| 0.79389 | 0.0202 |
| 0.81871 | 0.01886 |
| 0.84227 | 0.01734 |
| 0.86448 | 0.01567 |
| 0.88526 | 0.01389 |
| 0.90451 | 0.012 |
| 0.92216 | 0.00995 |
| 0.93815 | 0.00777 |
| 0.95241 | 0.00553 |
| 0.96489 | 0.00334 |
| 0.97553 | 0.0012 |
| 0.98429 | -0.0006 |
| 0.99114 | -0.002 |
| 0.99606 | -0.0028 |
| 0.99901 | -0.0029 |
| 1 | 0 |

ENHANCEMENTS TO HIGH EFFICIENCY CEILING FAN

This invention relates to ceiling fans, and in particular to three or more blade ceiling fans having large diameters of approximately 60 to approximately 64 inches, along with operating fan blades at reduced rotational speeds (approximately 75 to approximately 250 rpm) for reduced energy consumption with larger air movement volumes, and the invention claims the benefit of priority to Provisional Application 60/342,564 filed Dec. 26, 2001, and this invention is a Continuation-In-Part of U.S. application Ser. No. 09/976,515 filed Oct. 12, 2001, which claims the benefit of Provisional Application 60/265,241 filed Jan. 31, 2001, and this invention is a continuation-in-part of U.S. Ser. No. 09/711,599 filed Nov. 13, 2000 now U.S. Pat. No. 6,415,984, which is a divisional application of U.S. Ser. No. 09/415,883 filed Oct. 8, 1999 now U.S. Pat. No. 6,189,799, which is a divisional application of U.S. Ser. No. 09/067,236 filed Apr. 27, 1998 now U.S. Pat. No. 5,996,898 which is incorporated by reference, which is a continuation-in-part of U.S. Ser. No. 09/056,428 filed Apr. 7, 1998 now U.S. Pat. No. 6,039,541 which is incorporated by reference.

BACKGROUND AND PRIOR ART

Ceiling fans have been around for many years as a useful air circulator. The popular blade style over the years is a flat planar rectangular blade that can have a slight tilt, as shown for example in U.S. Pat. Des. No. 355,027 to Young and Pat. Des. No. 382,636 to Yang. These patents while moving air are not concerned with maximizing optimum downward airflow. Furthermore, many of the flat ceiling fan blades have problems such as poor performance at high speeds, wobbling, and excessive noise that is noticeable to persons in the vicinity of the fan blades.

Aircraft, marine and automobile engine propeller type blades have been altered over the years to shapes other than flat rectangular. See for example, U.S. Pat. No. 1,903,823 to Lougheed; U.S. Pat. No. 1,942,688 to Davis; U.S. Pat. No. 2,283,956 to Smith; U.S. Pat. No. 2,345,047 to Houghton; U.S. Pat. No. 2,450,440 to Mills; U.S. Pat. No. 4,197,057 to Hayashi; U.S. Pat. No. 4,325,675 to Gallot et al.; U.S. Pat. No. 4,411,598 to Okada; U.S. Pat. No. 4,416,434 to Thibert; U.S. Pat. No. 4,730,985 td Rothman et al. U.S. Pat. No. 4,794,633 to Hickey; U.S. Pat. No. 4,844,698 to Gornstein; U.S. Pat. No. 5,114,313 to Vorus; and U.S. Pat. No. 5,253,979 to Fradenburgh et al.; Australian Patent 19,987 to Eather. However, these patents are describing devices that are generally used for high speed water, aircraft, and automobile applications where the propellers are run at high revolutions per minute(rpm) generally in excess of 500 rpm. None of these propellers are designed for optimum airflow at low speeds of less than approximately 200 rpm which is the desired speeds used in overhead ceiling fan systems.

Some alternative blade shapes have been proposed for other types of fans. See for example, U.S. Pat. No. 1,506,937 to Miller; U.S. Pat. No. 2,682,925 to Wosik; U.S. Pat. No. 4,892,460 to Volk; U.S. Pat. No. 5,244,349 to Wang; Great Britain Patent 676,406 to Spencer; and PCT Application No. WO 92/07192.

Miller '937 requires that their blades have root "lips 26" FIG. 1 that overlap one another, and would not be practical nor useable for three or more fan blade operation for a ceiling fan. Wosik '925 describes "fan blades . . . particularly adapted to fan blades on top of cooling towers such for example as are used in oil refineries and in other industries.", column 1, lines 1-5, and does not describe any use for ceiling fan applications. The Volk '460 patent by claiming to be "aerodynamically designed" requires one curved piece to be attached at one end to a conventional planar rectangular blade. Using two pieces for each blade adds extreme costs in both the manufacturing and assembly of the ceiling itself. Furthermore, the grooved connection point in the Volk devices would appear to be susceptible to separating and causing a hazard to anyone or any property beneath the ceiling fan itself. Such an added device also has necessarily less than optimal aerodynamic properties.

Wang '349 requires each of their blades be "drilled with a plurality of perforations . . . for reducing weight . . . (and) may be reinforced by at least one rib . . . ", abstract. Clearly, such a blades would not be aesthetically pleasing to the user to have various holes and ribs visible on the blades, and there is no description for increasing airflow with such an arrangement. Great Britain Patent '406 describes " . . . fan impellers" that require an " . . . a unitary structure . . . constituted by a boss and four blades." page 1, lines 38+, and does not describe any single blades that can be used without any central boss type hub arrangement nor any use for less than three or more than four blade operation that will allow versatility for mounting separate numbers of blades, on a ceiling fan motor. PCT '192 is for use "in an electric fan to convert axially existing ambient air into a radially outward current of air.", abstract, and is shown in FIGS. 5-12 as being used for being mounted on "post(s)", and the like, and is not directed toward a ceiling fan operation, which would direct air primarily downward. Additionally, PCT '1192 generally requires an elaborate arrangement of using plural blades angled both upward and downward for operation.

U.S. Pat. No. 6,244,821 to Boyd et al. describes a ceiling fan of covering large blades of between 15 feet(180 inches) to approximately 40 feet(480 inches) which can not be used for conventional applications such as those used in homes and offices.

U.S. Pat. Re. Nos. 34,109 and 4,844,698 to Gornstein describes sixty inch blades for use vehicles such as hovercrafts, airboats, and dirigibles which have no application to being used as ceiling fans.

U.S. Pat. No. 5,860,788 to Sorensen mentions some old uses of having four to six blade fans that cover approximately 5 feet(60 inches) but has not no data on low speed operation, nor on using three blades, nor on using any twisted blade configurations, and would not have enhanced efficiency over conventional ceiling fan operation.

Although larger ceiling fans with diameters greater than 54 inches have been produced, these fans have not incorporated enhancements to the fan blade, such as maximizing twist, taper and air foil configurations to optimize air moving performance.

Thus, the need exists for better performing ceiling fans over the prior art.

SUMMARY OF THE INVENTION

The first objective of the subject invention is to provide ceiling fan blades that are aerodynamically optimized to move up to approximately 40% or more air than traditional flat planar ceiling fan blades.

The second objective of the subject invention is to provide ceiling fan blades that are more quiet and provide greater comfort than traditional flat planar ceiling fan blades.

The third objective of the subject invention is to provide ceiling fan blades that are less prone to wobble than traditional flat planar ceiling fan blades.

The fourth objective of the subject invention is to provide ceiling fan blades that reduce electrical power consumption and are more energy efficient over traditional flat planar ceiling fan blades.

The fifth objective of the subject invention is to provide ceiling fan blades designed for superior airflow at up to approximately 240 revolutions per minute(rpm).

The sixth objective of the subject invention is to provide ceiling fan blades being more aesthetically appealing than traditional flat planar ceiling fan blades.

The seventh objective of the subject invention is to provide ceiling fan blades with reduced low operational speeds for reverse operation to less than approximately 40 revolutions per minute.

The eighth objective of the subject invention is to provide ceiling fan blades having reduced low operational forward speeds of less than approximately 75 revolutions per minute.

The ninth objective of the subject invention is to provide ceiling fan blades with reduced medium operational forward speeds of up to approximately 120 revolutions per minute, using less than approximately 9 Watts at low speeds.

The tenth objective of the subject invention is to provide ceiling fan blades with an approximately 60(sixty) inch diameter(tip-to-tip fan diameter) for enhancing air moving efficiency at lower speeds than conventional fans.

The eleventh objective of the subject invention is to provide ceiling fan blades with an approximately 64(sixty four) inch diameter (tip-to-tip fan diameter) for enhancing air moving efficiency at lower speeds than conventional fans.

The twelth objective of the subject invention is to provide ceiling fan blades having a coverage area of up to approximately 2,827 square inches, which would be up to approximately a 23% increase in coverage over conventional 54 inch diameter fans.

The thirteenth objective of the subject invention is to provide ceiling fan blades having a coverage area of up to 3,217 square inches, which would be up to approximately 40% increase in coverage over conventional 54 inch diameter fans.

The fourteenth objective of the subject invention is to provide a three blade ceiling fan having greater air flow than conventional four and five blade ceiling fans. The fifteenth objective of the subject invention is to provide a three blade ceiling fan having less than the approximate power consumption as conventional four and five blade ceiling fans, with greater air flow than conventional blades.

Embodiments of the invention include ceiling fans having tip-to-tip spans of approximately 60 inches and approximately 64 inches, using three, four, five or more blades. Increased airflow and coverage areas of approximately 3,217 square inches or more can occur with these fans.

Further objects and advantages of this invention will be apparent from the following detailed descriptions of the presently preferred embodiments which are illustrated schematically in the accompanying drawings.

BRIEF DESCRIPTION OF THE FIGURES

FIG. 2A is a perspective view of single novel blade of the fan of FIGS. 1A-1C.

FIG. 5A, 5B, and 5C detail the airfoil coordinates for the ceiling fan blade of the invention.

DESCRIPTION OF THE PREFERRED EMBODIMENT

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

Testing of novel ceiling fan blades were first described in detail to parent patent application to the subject invention, namely U.S. patent Ser. No. 09/056,428 filed Apr. 7, 1998, now U.S. Pat. No. 6,039,541, and incorporated by reference. The initial novel blades were tested between May and June, 1997 at the Florida Solar Energy Center® in Cocoa, Fla., and included three parameters of measurement data: airflow (meters per second(m/s), power(in watts) and speed (revolutions per minute(rpm)). Those novel ceiling fan blades far surpassed the operating parameters of various ceiling fans in operation, as do the subject fan blades of this invention.

The invention further claims the benefit or priority to Provisional Application 60/342,564 filed Dec. 26, 2001, and this invention is also a Continuation-In-Part of U.S. application Ser. No. 09/976,515 filed Oct. 12, 2001, which claims the benefit of Provisional Application 60/265,241 filed Jan. 31, 2001, and this invention is a continuation-in-part of U.S. Ser. No. 09/711,599 filed Nov. 13, 2000 now U.S. Pat. No. 6,415,984, which is a divisional application of U.S. Ser. No. 09/415,883 filed Oct. 8, 1999 now U.S. Pat. No. 6,189,799, which is a divisional application of U.S. Ser. No. 09/067,236 filed Apr. 27, 1998 now U.S. Pat. No. 5,996,898 which is incorporated by reference, which is a continuation-in-part of U.S. Ser. No. 09/056,428 filed Apr. 7, 1998 now U.S. Pat. No. 6,039,541, all of which are incorporated by reference.

Figure 1A:
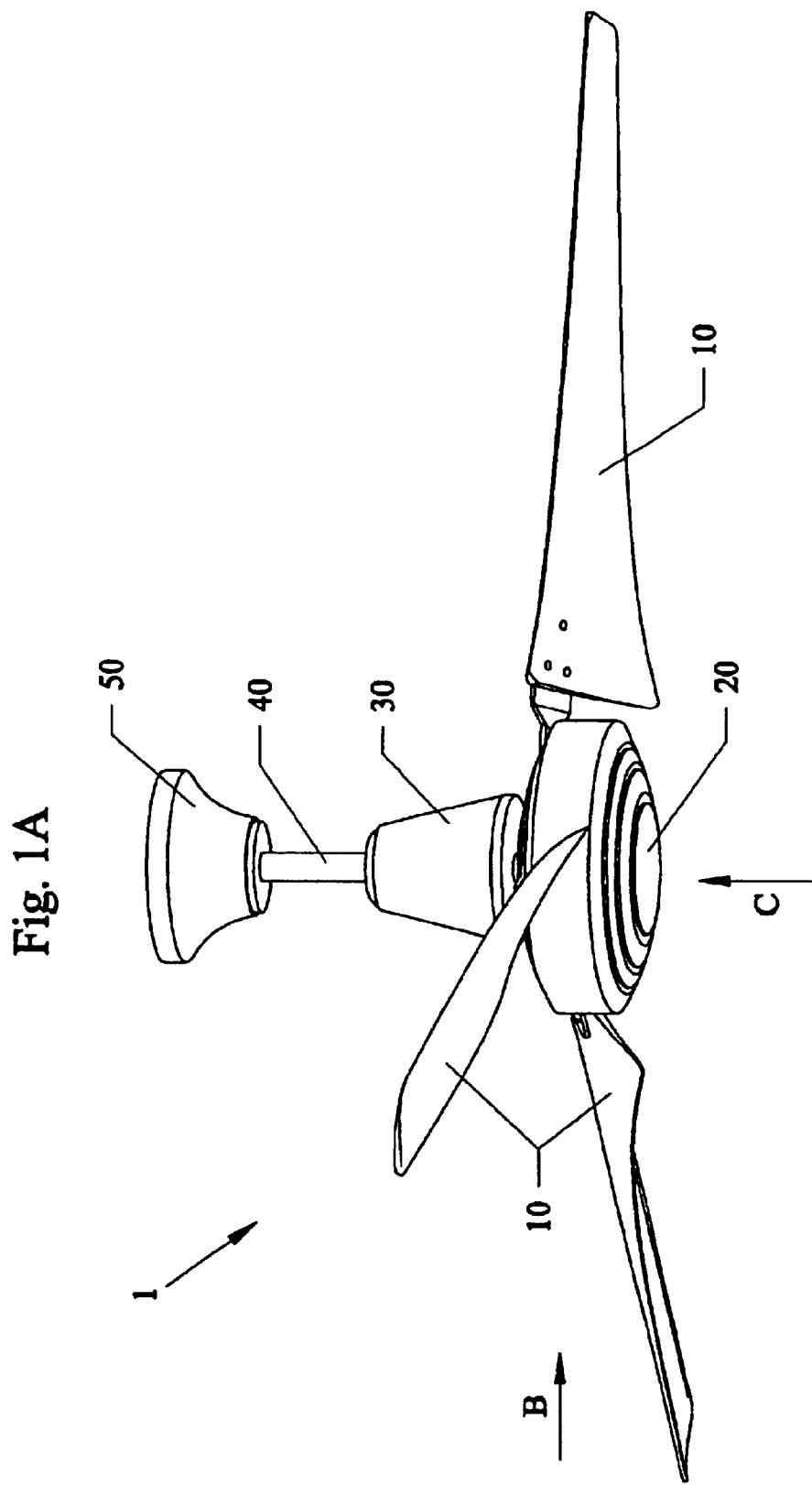
FIG. 1A is a perspective view of a novel three blade ceiling fan of the subject invention.
Figure 1B:
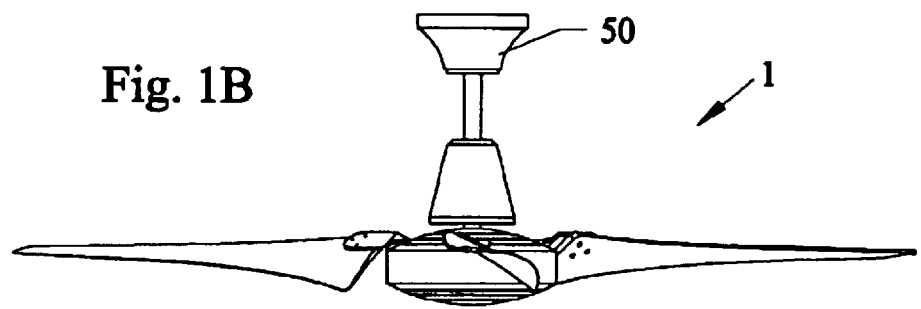
FIG. 1B is a side view of the three blade ceiling fan of FIG. 1A along arrow A.
Figure 1C:
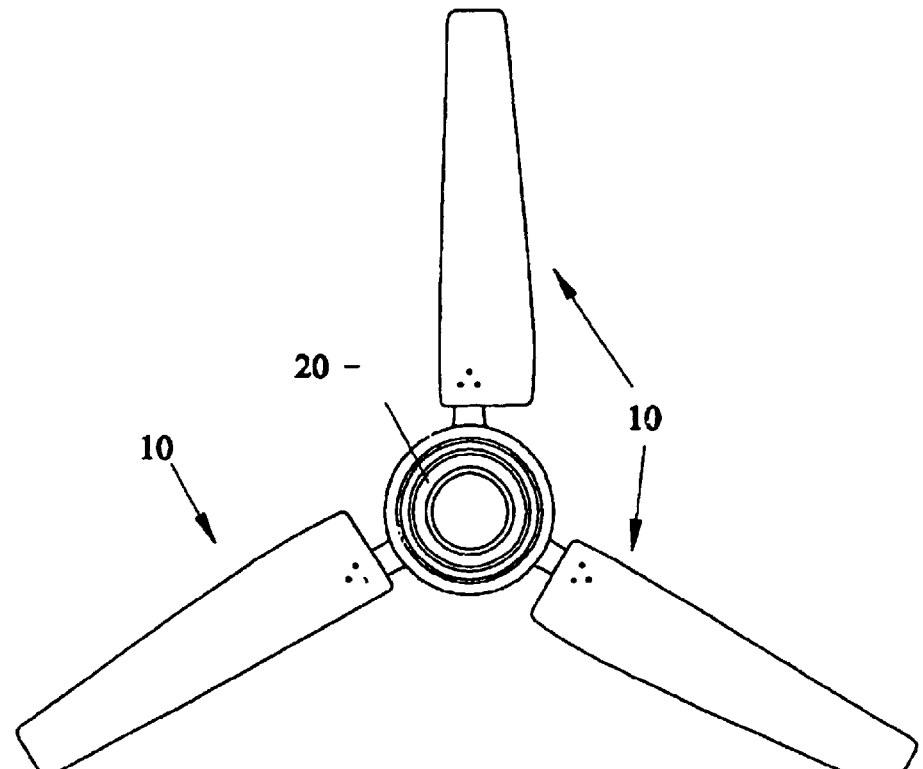
FIG. 1C is a bottom view of the three blade ceiling fan of FIG. 1A along arrow B.

FIG. 1A is a perspective view of a novel three blade ceiling fan 1 of the subject invention that can be used with approximately 60 inch diameter and 64 inch diameter fan blades. The subject invention uses twisted blades similar to those of the previous inventors inventions. FIG. 1B is a side view of the three blade ceiling fan 1 of FIG. 1A along arrow A. FIG. 1C is a bottom view of the three blade ceiling fan 1 of FIG. 1A along arrow B. Referring to FIGS. 1A-1C, ceiling fan 1 can include a three blade configuration 10, that are each attached to a hub portion 20, motor 30, extension rod 40 and ceiling mount 50.

FIG. 2A is a perspective view of single novel blade 10 of the fan 1 of FIGS. 1A-1C, showing one blade of a sixty(60) inch tip to tip ceiling fan 1. FIG. 2A shows single fan blade 10 having an overall length D1, between tip end 10TE and root end 10RE being approximately 24 inches, and various reference cross-sections(100TE, 100RS(5), 10RE) being spaced D2, approximately 4.0 inches from one another along the airfoil center line 10ACL, and blade 10 having leading edge 10LE and trailing edge 10TEDGE oriented along the blade rotational plane RP.

Figure 2B:
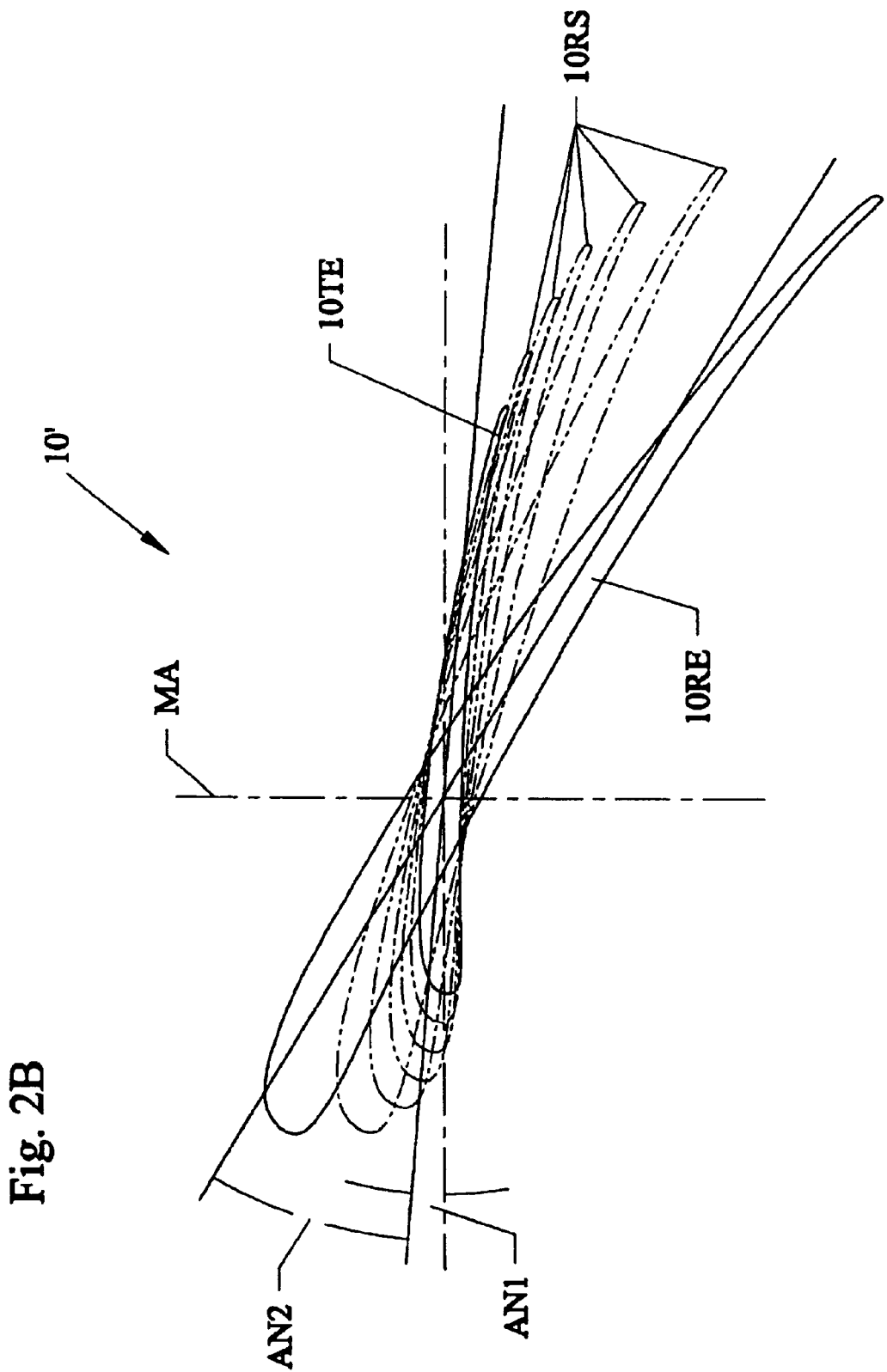
FIG. 2B shows the single blade of FIG. 2A represented by cross-sections showing the degrees of twist from the root end to the tip end.

FIG. 2B shows the single blade 10 of FIG. 2A represented by cross-sections 10' showing the degrees of twist from the root end to the tip end. FIG. 2B is an endview of the single fan blade 10 of FIG. 2A representing degrees of twist between from the root end 10RE to the tip end 10TE, when the blade 10 is positioned in a selected position. The tip end 10TE has an angle AN1 of approximately 5 degrees from a horizontal plane that is parallel to a ceiling. Similarly, the angle would be approximately 5 degrees from the motor axis(MA)(being the rotational axis of the blades. The root end 10RE would have an angle of twist of approximately 32 degrees(AN1+AN2). The mid cross-sectional areas noted as 10RS have varying angles of twist between the tip end 10TE and the root end 10RE.

Figure 3A:
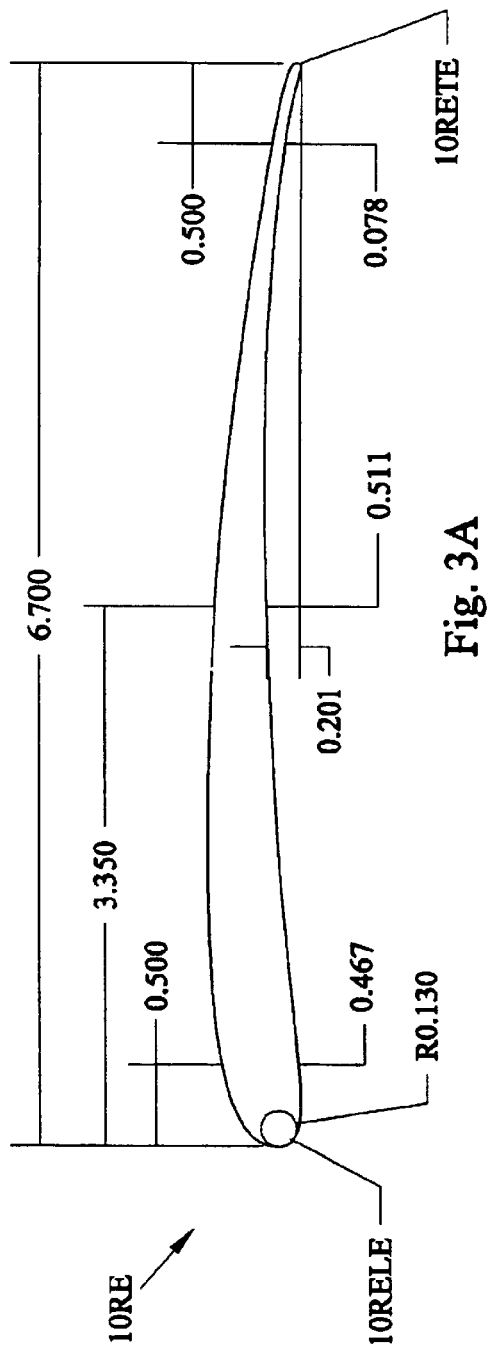
FIG. 3A is an end view of the root end cross-section portion of the blade of FIG. 2A.

FIG. 3A is an end view of the root end 10RE cross-section portion of the blade 10 of FIG. 2A. Root end 10RE has a width span of approximately 6.70 inches. The rounded leading edge 10RELE has a diameter of approximately 0.130 degrees being approximately 0.467 inches thick approximately 0.5 inches from rounded leading edge 10RELE. The middle of root end 10RE has a thickness of approximately 0.511 inches, with a generally concave shaped elongated bottom section raised midway approximately 0.201 inches and upper surface being generally convex shaped. Rounded tip end trailing edge 10RETE has a thickness of approximately 0.078 inches approximately 0.5 inches from the rounded trailing edge 10RETE.

Figure 3B:
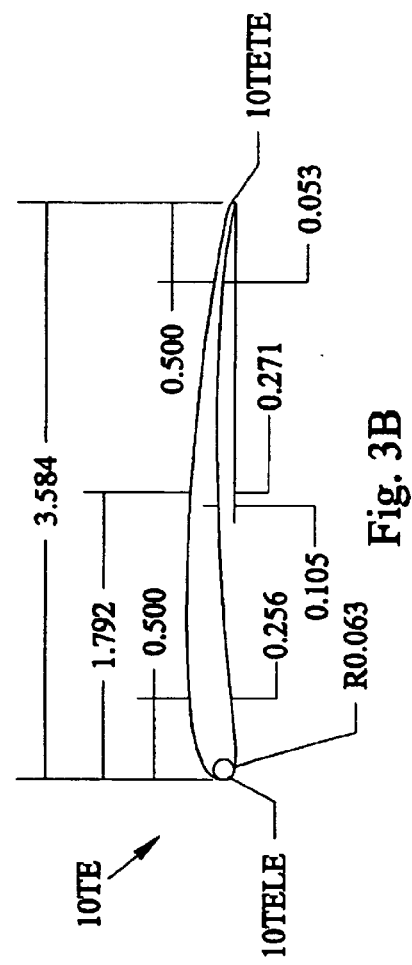
FIG. 3B is an end view of the tip end cross-section portion of the blade of FIG. 2A.

FIG. 3B is an end view of the tip end 10TE cross-section portion of the blade 10 of FIG. 2A. Tip end 10TE has a width span of approximately 3.584 inches. The rounded leading edge 10TELE has a diameter of approximately 0.063 degrees being approximately 0.256 inches thick approximately 0.5 inches from rounded leading edge 10TELE. The middle of tip end 10TE has a thickness of approximately 0.166 inches (0.271–0.105), with a generally concave shaped elongated bottom section raised approximately 0.105 inches and upper surface being generally convex shaped. Rounded tip end trailing edge 10TETE has a thickness of approximately 0.053 inches approximately 0.5 inches from the rounded trailing edge 10TETE.

Figure 4A:
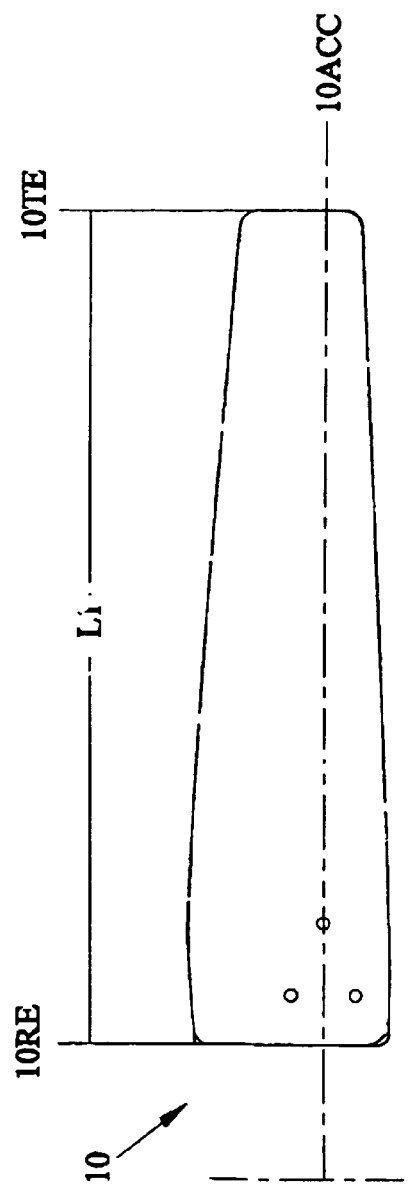
FIG. 4A is a top view of the blade of FIG. 2A along arrow 4A.
Figure 4B:
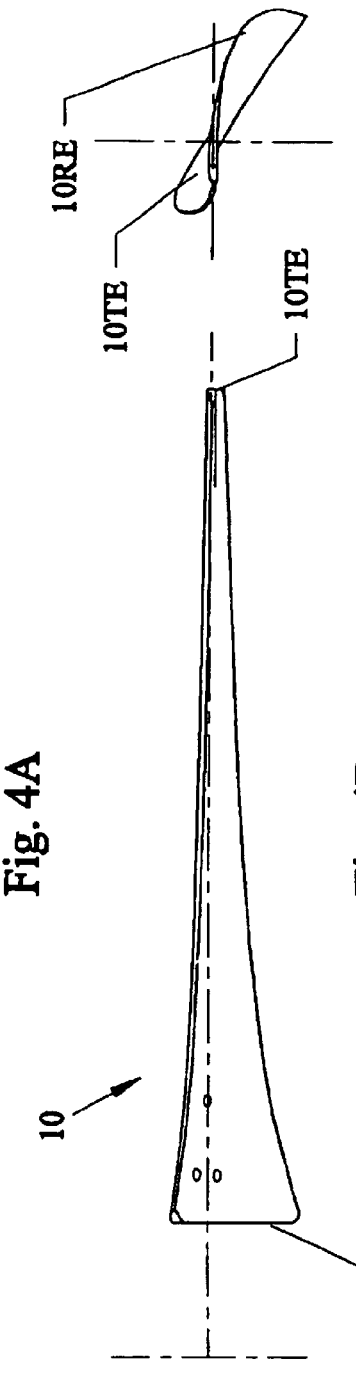
FIG. 4B is a side view of the blade of FIG. 2A along arrow 4B.
Figure 4C:
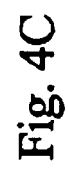
FIG. 4C is an view of the blade of FIG. 2A along arrow 4C.
Figure 6:
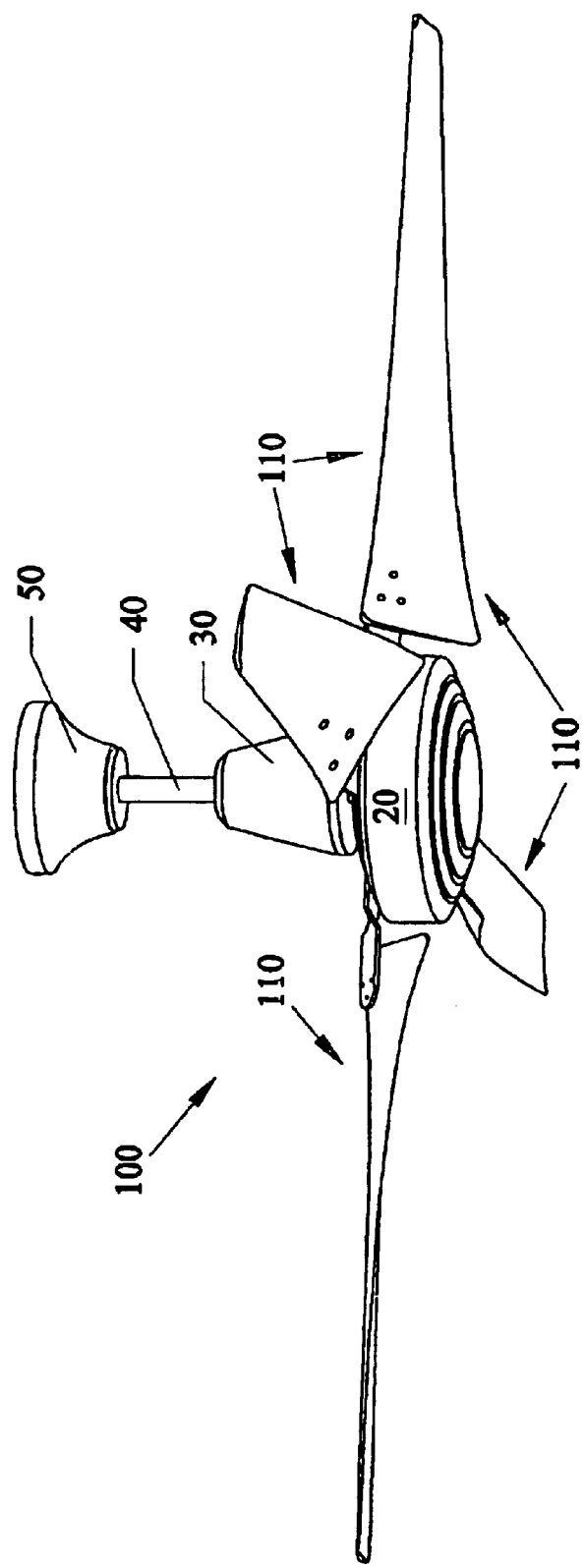
FIG. 6 shows a perspective view of a four blade version of the subject invention.
Figure 7:
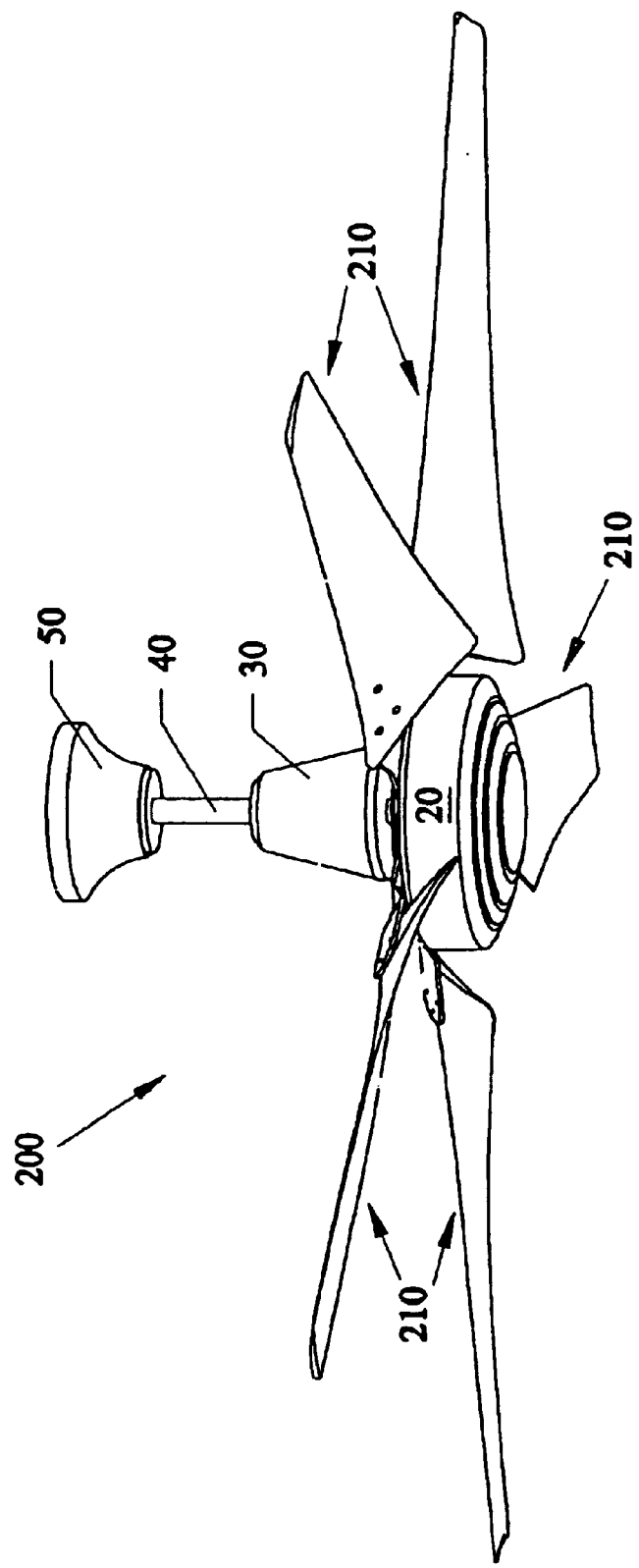
FIG. 7 shows a perspective view of a five blade version of the subject invention.

FIG. 4A is a top view of the blade 10 of FIG. 2A along arrow 4A. FIG. 4B is a side view of the blade 10 of FIG. 2A along arrow 4B. FIG. 4C is an view of the blade 10 of FIG. 2A along arrow 4C. Referring to FIGS. 4A-4C, the length, L1 can be approximately 24 inches to approximately 25 inches from tip end 10TE to root end 200 RE. FIG. 6 is a side view of the ceiling fan blade 110 of FIG. 5 along arrow A2. FIG. 7 is an end view of the ceiling fan blade 110 of FIG. 6 along arrow A3.

FIG. 5A, 5B, and 5C detail the airfoil coordinates for the ceiling fan blade of the invention. FIGS. 5A-5C, are airfoil coordinates for the blades of the preceeding figures, and are nondimensional numbers. The left hand columns represent the X-coordinates divided by the Chord of the airfoil. The right hand columns represents the Y-coordinates of the airfoil. The actual coordinates can be calculated by multiplying the nondimensional numbers a selected chord length.

Table 1 refers to the input data where velocity measurements in meters per second were compared between the novel GW(Gossamer Wind) Industrial 3 blade fan with 60 inch blades compared to the Gossamer Wind Windward II, the FSEC/AERO, and the ional ceiling fans models by Hunter, CF705WW, and F4852WW. Table 1 is test data at low speeds.

TABLE 1

| ft from center | Industrial | Windward II | FSEC/Aero | Hunter-Low | CF705WW | F4852WW |
| --- | --- | --- | --- | --- | --- | --- |
| 0 | 1.310 | 0.900 | 0.865 | 0.270 | 0.105 | 0.135 |
| 0.5 | 1.210 | 1.080 | 0.930 | 0.240 | 0.425 | 0.270 |
| 1 | 1.010 | 1.170 | 0.640 | 0.370 | 0.350 | 0.270 |
| 1.5 | 0.710 | 0.840 | 0.385 | 0.480 | 0.145 | 0.295 |
| 2 | 0.440 | 0.230 | 0.270 | 0.400 | 0.190 | 0.060 |
| 2.5 | 0.090 | 0.070 | 0.095 | 0.080 | 0.095 | 0.140 |
| 3 | 0.060 | 0.050 | 0.020 | 0.010 | 0.050 | 0.020 |
| 3.5 | 0.070 | 0.020 | 0.040 | 0.000 | 0.020 | 0.035 |
| 4 | 0.060 | 0.020 | 0.040 | 0.000 | 0.010 | 0.015 |
| 4.5 | 0.080 | 0.020 | 0.005 | 0.000 | 0.000 | 0.045 |
| 5 | 0.000 | 0.020 | 0.020 | 0.000 | 0.000 | 0.070 |
| 5.5 | 0.000 | 0.060 | 0.035 | 0.000 | 0.000 | 0.040 |

Table 2 shows the operational results of Table 1 for the 60" blades.

| Fan Type | Industrial | Windward II | FSEC/Aero | Hunter-Low | CF705WW | F4852WW |
| --- | --- | --- | --- | --- | --- | --- |
| Average Velocity (m/s) | 0.42 | 0.37 | 0.28 | 0.15 | 0.12 | 0.12 |
| Total CFM | 2493.0 | 2341.5 | 1605.2 | 1396.1 | 914.9 | 842.2 |

-continued

| Fan Type | Industrial | Windward II | FSEC/Aero | Hunter-Low | CF705WW | F4852WW |
|---|---|---|---|---|---|---|
| Total Watts | 14.45 | 17.9 | 9.1 | 8.9 | 9.6 | 7.7 |
| Total CFM/Watts | 172.5 | 130.8 | 176.4 | 156.9 | 95.3 | 109.4 |

Referring to Tables 1 and 2, at low speed, approximately 86 rpm, the three bladed GW Industrial draws approximately 14.5 Watts while producing approximately 2500 CFM of air flow, which clearly exceeds conventional fans by Hunter, CF705WW, and F4852WW in both CFM and CFM/Watt.

At high speed, the three bladed GW Industrial draws approximately 102 Watts to produce approximately 242 rpm, and the fan produces approximately 5700 CFM, considerably greater than the conventional fans. The motor was 18×188 Power Max motor. Model 526 012: CF10-H60, commercial electric motor.

Table 3 shows the novel 60(sixty) inch diameter novel blades at low, medium and high speeds in revolutions per minute(rpm) with Power Draw as the instantaneous electric power requirement in Watts at those speeds, and air coverage profile under the fans as compared to previous invention and a standard large 54(fifty-four) inch ceiling fan. The conventional 54"(averaged) is a Emerson CF705WW, off-the-shelf fan model. CFM refers to cubic feet per minute.

TABLE 3

|  | GW 60" | GW 54" | Emerson CF705WW |
|---|---|---|---|
| Air Flow Coverage Area(square inches) | 2,827 | 2,290 | 2,290 |
| Low Speed |  |  |  |
| Power Draw | 86 rpm | 90 rpm |  |
|  | 14.5 Watts | 17.9 Watts | 10.0 Watts |
| CFM | 2493 | 2341 | 915 |
| CFM/Watts | 173 | 131 | 95 |
| High Speed | Above 102 rpm |  |  |
| Power Draw | 75 | 62 | 50 |
| CFM | 5216 | 4791 | 2617 |
| CFM/Watts | 69 | 77 | 52 |

High speed refers to the medium high speed for the industrial fan.

A purpose and desirability of the new configuration is re-establish true air foil for fan blade design by limiting fan speed in reverse operation to "low" only with capacitors to limit that speed to approximately 40 rpm.

The reason for this desirability is that the lack of true air foil causes flow separation in last third of fan blade, loss of efficiency and a more limited air flow pattern(air flow only directly under the fan). Reestablishing a thinner trailing edge will reduce flow turbulence in the wake of the movement of the fan blade.

The novel predecessors to the subject invention (Windward II, and FSEC/Aero) provide air flow amounts at low speed(approximately 90 rpm) that conventional fans must run at medium speeds with greater power use and higher rpm rates.

The air flow resistance increases at the square of velocity, where the motor power necessary to overcome it(in Watts) increases at the cube of velocity. Thus, the previous invention fans(Windward II, and FSEC/Aero) can use only approximately 17 Watts at low speed which can be cut approximately 9 Watts if the fan speed is dropped from approximately 90 rpm to approximately 75 rpm while still maintaining superior air flow to the conventional ceiling fans.

Table 4 shows a comparison of running a modified version of the subject invention with revised capacitors on the Model Windward II.

TABLE 4

| Capacitors | 4.2 + 6 + 6 | 4.2 + 4.5 + 4.5 |
|---|---|---|
| Power | 17.9 Watts | 11.4 Watts |
| RPMs | 90 rpm | 75 rpm |
| Air Flow | 2341 cfm | 1810 cfm/W |

From the above it is apparent that dropping power to approximately 11.4 Watts does not drop flow proportionately, so that the invention's air moving efficiency goes up by approximately 21%.

Since power requirements for air movement increase at the cube of velocity, the air moving efficiency of the novel blades has been increased with a standard motor since the fan blade length has been increased since the large fan blade cuts a larger circumference and the tip velocities are lower. The conventional standard 54" blade diameters(having flat type blades of approximately 27" inches in length) will describe a circle of approximately 170 inches. The novel 60 inch blades travel approximately a distance of approximately 188 inches. The conventional 54" fan blades form a coverage area of approximately 2,290 square inches directly beneath the fan. The novel 60" fan blades form a coverage area of approximately 2,827 square inches which is approximately 23% greater in coverage.

As discussed above, the conventional standard 54" blade diameters(having flat type blades of approximately 27" inches in length) will describe a circle of approximately 170 inches. The novel 64 inch blades travel approximately a distance of approximately 201 inches. The conventional 54" fan blades form a coverage area of approximately 2,290 square inches beneath the fan. The novel 64" fan blades form a coverage area of approximately 3,217 square inches which is approximately 40% greater in coverage.

Although the preferred embodiments of the 60" and 64" twisted blades have been tested in 3 blade configurations, the invention can be used with four, five, or more blades.

FIG. 6 shows a perspective view of a four blade version 100 of the subject invention showing four blades 110 each attached to a hub portion 20, motor 30, extension rod 40 and ceiling mount 50.

The benefits of using the novel larger blades causes an increased air flow coverage which means a larger comfort zone for occupants within a given room(space) For example, increased airflow coverage increases from approximately 15.9 square feet with a 54" fan to approximately 19.6 square feet with a 60" fan and to approximately 22.3 square feet with a 64' fan.

FIG. 7 shows a perspective view of a five blade version 200 of the subject invention showing four blades 210 each attached to a hub portion 20, motor 30, extension rod 40 and ceiling mount 50.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of increasing air flow coverage under a ceiling fan, comprising the steps of:

providing at least two twisted ceiling fan blades attached to a ceiling fan motor, each of the fan blades being substantially planar having a twist running from a root end to a tip end, with the root end having a substantially greater width span than the tip end; and running the blades to cover an area of greater than approximately 2290 square inches under the ceiling fan to increase air flow coverage under the ceiling fan to be at least approximately 23% greater as compared to using approximately 52 inch diameter blades.

2. The method of claim 1, wherein the providing step includes the step of:

providing at least two blades being at least approximately 60 inches in diameter.

3. The method of claim 1, wherein the step of running includes the step of: covering an area up to approximately 2,827 square inches.

4. The method of claim 1, wherein the providing step includes the step of:

providing at least two blades being at least approximately 64 inches in diameter.

5. The method of claim 1, wherein the step of running includes the step of:

covering an area up to approximately 3,217 square inches.

6. The method of claim 1, wherein the providing step further includes:

providing at least three twisted blades.

7. The method of claim 1, wherein the providing step further includes the step of providing each of the blades with the root end having a width span of approximately 6.7 inches running to the tip end having a width span of approximately 3.5 inches.

8. The method of claim 1, wherein the providing step further includes the step of:

providing each of the blades with a bottom concave curved surface and a top convex curved surface.

9. The method of claim 8, wherein the providing step further includes the step of:

providing each of the blades with a continuously rounded leading edge.

10. The method of claim 1, wherein the providing step further includes the step of:

providing each of the blades with the root end having a degree of twist substantially greater from a horizontal plane that is parallel to the ceiling, and a degree of twist of the tip end.

11. A method of enhancing air flow in ceiling fans, comprising the steps of:

rotating fan blades attached to a ceiling at a speed of up to approximately 75 rpm; and drawing power supply of up to approximately 17 Watts, wherein the method generates downward air flows greater than similar flat bladed fans.

12. The method of claim 11, further including the step of: providing at least two twisted blades.

13. The method of claim 11, further including the step of: providing at least three twisted blades.

14. The method of claim 11, further including the step of: providing at least four twisted blades.

15. The method of claim 1, further including the step of: providing at least five twisted blades.

16. A method of operating an overhead ceiling fan, comprising the steps of:

rotating fan blades attached to a ceiling fan motor at a speed of up to approximately 86 rpm; and drawing a power supply from the motor of up to approximately 14.5 Watts; and generating a downward flow of up to approximately 2500 CFM beneath the blades.

17. The method of claim 16, further comprising the step of:

providing blades having twisted configurations.

18. The method of claim 16, further comprising the step of:

providing approximately 60 inch diameter blades.

19. The method of claim 16, further comprising the step of:

providing approximately 64 inch diameter blades.

20. The method of claim 16, further comprising the step of:

providing three blades.

21. The method of claim 16, further comprising the step of:

providing four blades.

22. The method of claim 16, further comprising the step of:

providing five blades.

23. A method of operating an overhead ceiling fan, comprising the steps of:

rotating fan blades attached to a ceiling fan motor at a speed of up to approximately 242 rpm; and drawing a power supply from the motor of up to approximately 102 Watts; and generating a downward flow of up to approximately 5700 CFM beneath the blades.

24. The method of claim 23, further comprising the step of:

providing blades having twisted configurations.

25. The method of claim 23, further comprising the step of:

providing approximately 60 inch diameter blades.

26. The method of claim 23, further comprising the step of:

providing approximately 64 inch diameter blades.

27. The method of claim 23, further comprising the step of:

providing three blades.

28. The method of claim 23, further comprising the step of:

providing four blades.

29. The method of claim 23, further comprising the step of:

providing five blades.

30. A method of increasing air flow coverage under a ceiling fan, comprising the steps of: providing at least two twisted ceiling fan blades attached to a ceiling fan motor, each of the blades having a substantially planar configuration between a root end and a tip end, with the root end having a greater degree of twist than the tip end, and a substantially greater span width than the span width of the tip end; and running the blades to cover an area of greater than approximately 2290 square inches under the ceiling fan to increase air flow coverage to be at least approximately 40% greater than as compared to using approximately 52 inch diameter blades.

31. The method of claim 30, wherein the providing step includes the step of: providing at least two blades being at least approximately 64 inches in diameter.

32. The method of claim 30, wherein the step of running includes the step of: covering an area up to approximately 2,827 square inches.

33. The method of claim 30, wherein the step of running includes the step of: covering an area up to approximately 3,217 square inches.

34. The method of claim 30, wherein the providing step further includes the step of:

providing each of the blades with the root end having a twist of approximately 32 degrees from a horizontal plane that is parallel to the ceiling, and the tip end having a twist of approximately 5 degrees from the horizontal plane that is parallel to the ceiling.

35. The method of claim 30, wherein the providing step further includes the step of:

providing each of the blades with a bottom concave curved surface, and a top convex curved surface.

36. The method of claim 35, wherein the providing step further includes the step of:

providing each of the blades with a continuously rounded leading edge.

* * * * *